United States Patent
Agiwal et al.

(10) Patent No.: US 11,310,648 B2
(45) Date of Patent: Apr. 19, 2022

(54) METHOD FOR TRIGGERING TRANSMISSION OF USER EQUIPMENT (UE)-TO-NETWORK RELAY INDICATION

(71) Applicant: Samsung Electronics Co., Ltd, Suwon-si (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/544,778

(22) Filed: Aug. 19, 2019

(65) Prior Publication Data
US 2019/0373440 A1 Dec. 5, 2019

Related U.S. Application Data

(63) Continuation of application No. 15/551,576, filed as application No. PCT/KR2016/001561 on Feb. 16, 2016, now Pat. No. 10,390,206.

(30) Foreign Application Priority Data

Feb. 16, 2015 (IN) ............................. 755/CHE/2015
Feb. 12, 2016 (IN) ............................. 755/CHE/2015

(51) Int. Cl.
*H04W 8/00* (2009.01)
*H04W 24/08* (2009.01)
(Continued)

(52) U.S. Cl.
CPC ........... *H04W 8/005* (2013.01); *H04W 24/08* (2013.01); *H04W 76/10* (2018.02); *H04W 88/08* (2013.01); *H04W 76/14* (2018.02); *H04W 88/04* (2013.01)

(58) Field of Classification Search
CPC ..... H04W 8/005; H04W 76/10; H04W 88/08; H04W 24/08; H04W 76/14; H04W 88/04; H04W 40/12; H04W 40/22
See application file for complete search history.

(56) References Cited

U.S. PATENT DOCUMENTS

| 9,681,266 B2 | 6/2017 | Kim et al. |
| 9,756,676 B2 | 9/2017 | Liu et al. |

(Continued)

FOREIGN PATENT DOCUMENTS

| CN | 1901400 A | 1/2007 |
| CN | 101960787 A | 1/2011 |

(Continued)

OTHER PUBLICATIONS

European Search Report dated Feb. 9, 2018 in connection with European Patent Application No. 16 75 2674, 8 pages.
Alcatel-Lucent Shanghai Bell et al., "D2D Discovery design for groupcast, broadcast, and relay", 3GPP TSG RAN WG1 Meeting #74, Aug. 19-13, 2013, 7 pages, R1-132995.
LG Electronics, "Details of Resource Allocation for D2D Synchronization", 3GPP TSG RAN WG1 Meeting #78bis, Oct. 6-10, 2014, 6 pages, R1-144014.

(Continued)

*Primary Examiner* — Walli Z Butt

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein provide a method for triggering a transmission of a UE-to-Network relay indication comprising receiving, by UE, one of UE-to-Network relay criteria broadcasted by a base station, measuring, at the UE, a link quality parameter between the UE and the base station, detecting, by the UE, that the link quality parameter meets the UE-to-Network relay criteria, and transmitting, by the UE, the UE-to-Network relay indication (i.e. discovery message indicating itself as the UE-to-Network relay) on a Device to Device (D2D) discovery channel.

8 Claims, 8 Drawing Sheets

(51) Int. Cl.
    *H04W 76/10*     (2018.01)
    *H04W 88/08*     (2009.01)
    *H04W 88/04*     (2009.01)
    *H04W 76/14*     (2018.01)

(56) References Cited

U.S. PATENT DOCUMENTS

| | | | |
|---|---|---|---|
| 10,194,304 | B2 | 1/2019 | Chen et al. |
| 2007/0002766 | A1 | 1/2007 | Park et al. |
| 2011/0134827 | A1* | 6/2011 | Hooli ............... H04W 48/08 370/315 |
| 2015/0029866 | A1 | 1/2015 | Liao et al. |
| 2015/0038136 | A1 | 2/2015 | Wu et al. |
| 2016/0142898 | A1* | 5/2016 | Poitau ............... H04W 72/0446 370/329 |
| 2016/0219640 | A1 | 7/2016 | Jung et al. |
| 2017/0244468 | A1* | 8/2017 | Zhao ............... H04W 36/24 |
| 2017/0325243 | A1 | 11/2017 | Yasukawa et al. |
| 2017/0347338 | A1 | 11/2017 | Chen et al. |
| 2018/0035354 | A1 | 2/2018 | Martin et al. |
| 2021/0058902 | A1* | 2/2021 | Chen ............... H04W 4/00 |

FOREIGN PATENT DOCUMENTS

| | | |
|---|---|---|
| CN | 104105155 A | 10/2014 |
| CN | 104219733 A | 12/2014 |
| CN | 104349504 A | 2/2015 |
| CN | 106211026 A | 12/2016 |
| EP | 2753121 A1 | 7/2014 |
| EP | 3226583 A1 | 10/2017 |
| WO | 2010/006649 A1 | 1/2010 |
| WO | WO2014069064 A1 | 5/2014 |
| WO | 2014/104627 A1 | 7/2014 |
| WO | 2014/137098 A1 | 9/2014 |

OTHER PUBLICATIONS

Fujitsu, "Discussion of D2D measurement", 3GPP TSG RAN WG1 Meeting #79, Nov. 17-21, 2014, 4 pages, R1-144642.
Samsung, "Remaining issues on conditions for D2DSS transmission", 3GPP TSG RAN WG1 Meeting #79, Nov. 17-21, 2014, 7 pages, R1-144719.
International Search Report dated May 19, 2016 in connection with International Patent Application No. PCT/KR2016/001561, 4 pages.
Written Opinion of the International Searching Authority dated May 19, 2016 in connection with International Patent Application No. PCT/KR2016/001561, 5 pages.
NEC, "ProSe Relay discovery assisted by E-UTRAN", SA WG2 Meeting #99, Sep. 23-27, 2013, S2-133376, 4 pages.
LG Electronics, "Threshold control for ProSe UE-to-Network Relay", SA WG2 Meeting #101 bis, Feb. 17-21, 2014, S2-140641, 5 pages.
Office Action dated Nov. 2, 2020 in connection with Chinese Patent Application No. 201680022220.1, 18 pages.
The Second Office Action dated Jun. 16, 2021, in connection with Chinese Application No. 201680022220.1, 17 pages.
Notification of Fulfilling of Registration Formality dated Sep. 3, 2021, in connection with Chinese Application No. 201680022220.1, 9 pages.
Wang, Qiuping, et al., "Study on Coverage of Dead Zone based on Fixed Relay," Communications Technology, vol. 44, No. 1, Issue 229, 2011, 3 pages.
Korean Intellectual Property Office, "Notice of Non-Final Rejection" dated Feb. 15, 2022, in connection with Korean Patent Application No. 10-2017-7026003, 16 pages.
Samsung, "Review issue list for ASN.1 freeze", 3GPP TSG-RAN2#89 meeting, R2-1504338, Athens, Greece, Feb. 9-13, 2015, 130 pages.

* cited by examiner

METHOD FOR TRIGGERING TRANSMISSION OF USER EQUIPMENT (UE)-TO-NETWORK RELAY INDICATION

CROSS-REFERENCE TO RELATED APPLICATIONS

This application is a continuation of U.S. patent application Ser. No. 15/551,576 filed on Aug. 16, 2017, which is a 371 of PCT International Application No. PCT/KR2016/001561 filed on Feb. 16, 2016, which claims priority to India Patent Application Nos. 755/CHE/2015 filed on Feb. 12, 2016 and 755/CHE/2015 filed on Feb. 16, 2015, the disclosures of which are herein incorporated by reference in their entirety.

BACKGROUND

1. Field

The embodiments herein generally relate to wireless communication network. More particularly, related to a mechanism for triggering transmission of UE-to-Network relay indication.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Device to Device (D2D) communication is being studied in communication standard groups to enable data communication services between the UEs. During the D2D communication a transmitting D2D UE can transmit data packets to a group of D2D UEs or broadcast data packets to all the D2D UEs. D2D communication between the transmitter and receiver(s) is connectionless in nature i.e. there is no connection setup between the transmitter and receiver before the transmitter starts transmitting the data packets. During the transmission, the transmitter includes the source ID and the destination ID in the data packets. The source ID is set to the UE ID of the transmitter. The destination ID is the broadcast ID or group ID of intended recipient of the transmitted packet.

A D2D UE (i.e. Remote UE) can communicate with network via another D2D UE (i.e. UE-to-Network Relay). The D2D direct discovery procedure is used to discover UE-to-Network relay. The UE capable of supporting the UE-to-Network relay functionality and in coverage of network periodically broadcasts User Equipment (UE)-to-Network Relay indication (i.e. discovery message indicating itself as the UE-to-Network relay). The discovery message is transmitted on D2D discovery channel. The remote UE interested in searching for UE-to-Network Relay monitors D2D discovery channel for receiving the UE-to-Network relay indication (i.e. discovery message indicating itself as the UE-to-Network relay) transmitted by the UE-to-Network Relay in its proximity. Although, there may not be any Remote UEs in vicinity, to the UE-to-Network relay, and also the Remote UEs if in the vicinity may not be in need of UE-to-Network Relay to communicate with the network.

As a result, the UE capable of supporting the UE-to-Network relay broadcasting the discovery message periodically may unnecessarily leads to the wastage of resources and increased power consumption in the UE.

Thus, there exists a need of robust and efficient mechanism for triggering the transmission of UE-to-Network relay indication (i.e. discovery message indicating itself as the UE-to-Network relay) by the UE, capable of supporting UE-to-Network relay functionality.

The principal aspect of the embodiments herein is to provide a mechanism for triggering a transmission of a User Equipment (UE)-to-Network relay indication (i.e. discovery message indicating itself as the UE-to-Network relay).

Another aspect of the embodiments herein is to provide a mechanism for receiving, by a User Equipment (UE), one of UE-to-Network relay criteria broadcasted by a base station.

Another aspect of the embodiments herein is to provide a mechanism for measuring, at the UE, a link quality parameter between the UE and the base station.

Another aspect of the embodiments herein is to provide a mechanism for detecting, by the UE, that the link quality parameter meets the UE-to-Network relay criteria.

Another aspect of the embodiments herein is to provide a mechanism for transmitting, by the UE, a discovery message indicating the UE-to-Network relay indication (i.e. discovery message indicating itself as the UE-to-Network relay) on a Device to Device (D2D) discovery channel.

Another aspect of the embodiments herein is to provide a mechanism for receiving, at a base station, a request message comprising a link quality parameter between a UE and the base station from the UE.

Another aspect of the embodiments herein is to provide a mechanism for detecting, at the base station, the link quality parameter meets the UE-to-Network relay criteria.

Another aspect of the embodiments herein is to provide a mechanism for sending, by the base station, a response message to the UE to trigger transmission of UE-to-Network relay indication (i.e. discovery message indicating itself as the UE-to-Network relay) on a D2D discovery channel.

SUMMARY

Accordingly the embodiments herein provide a method for triggering a transmission of a User Equipment (UE)-to-Network relay indication. Further, the method includes receiving, by a User Equipment (UE), one of UE-to-Network relay criteria broadcasted by a base station. Further, the method includes measuring, at the UE, a link quality parameter between the UE and the base station. Further, the method includes determining, by the UE, whether the link quality parameter meets the one of the UE-to-Network relay criteria. Further, the method includes transmitting, by the UE, a UE-to-Network relay indication (i.e. discovery message indicating itself as the UE-to-Network relay) on a Device to Device (D2D) discovery channel, if the link quality parameter meets the one of the UE-to-Network relay criteria.

Accordingly the embodiments herein provide a method for triggering a transmission of a User Equipment (UE)-to-Network relay indication. Further, the method includes receiving, at a base station, a request message comprising a link quality parameter between a UE and the base station from the UE. Further, the method includes determining, at the base station, whether the link quality parameter meets a UE-to-Network relay criteria. Further, the method includes sending, by the base station, a response message to the UE to trigger transmission of the UE-to-Network relay indication (i.e. discovery message indicating itself as the UE-to-Network relay) on a D2D discovery channel if the link quality parameter meets the UE-to-Network relay criteria.

Accordingly the embodiments herein provide a User Equipment (UE) for triggering a transmission of a UE-to-Network relay indication. The UE includes a memory, a communication interface coupled to the memory and a controller coupled to the communication interface, wherein the controller is configured to receive one of UE-to-Network relay criteria broadcasted by a base station. Further, the controller is configured to measure a link quality parameter between the UE and the base station. Further, the controller is configured to determine that the link quality parameter meets the one of the UE-to-Network relay criteria. Further, the controller is configured to transmit the UE-to-Network relay indication (i.e. discovery message indicating itself as the UE-to-Network relay) on a D2D discovery channel if the link quality parameter meets the one of the UE-to-Network relay criteria.

Accordingly the embodiments herein provide a base station for triggering a transmission of a UE-to-Network relay indication. The base station includes a memory, a communication interface coupled to the memory and a controller coupled to the communication interface, wherein the controller unit is configured to receive a request message comprising a link quality parameter between a UE and the base station from the UE. Further, the controller is configured to determine whether the link quality parameter meets a UE-to-Network relay criteria. Further, the controller is configured to send a response message to the UE to trigger a discovery message indicating the UE-to-Network relay indication (i.e. discovery message indicating itself as the UE-to-Network relay) on a D2D discovery channel if the link quality parameter meets the one of the UE-to-Network relay criteria.

Accordingly the embodiments herein provide a User Equipment (UE) for triggering a transmission of a UE-to-Network relay indication. The UE includes a memory unit, a communication interface unit coupled to the memory unit and a controller unit coupled to the communication unit, wherein the controller unit is configured to send a request message comprising a link quality parameter between the UE and the base station from the UE. Further, the controller unit is configured to receive a response message to trigger transmission of a UE-to-Network relay indication (i.e. discovery message indicating itself as the UE-to-Network relay) on a D2D discovery channel.

Accordingly the embodiments herein provide base station for triggering a transmission of a UE-to-Network relay indication. The base station includes a memory unit, a communication interface unit coupled to the memory unit and a controller unit coupled to the communication unit, wherein the controller unit is configured to receive a request message comprising a link quality parameter between a UE and the base station from the UE. Further, the controller unit is configured to detect the link quality parameter does not meets the UE-to-Network relay criteria. Further, the controller unit is configured to send a response message to the UE to stop transmission of UE-to-Network relay indication (i.e. discovery message indicating itself as the UE-to-Network relay) on a D2D discovery channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
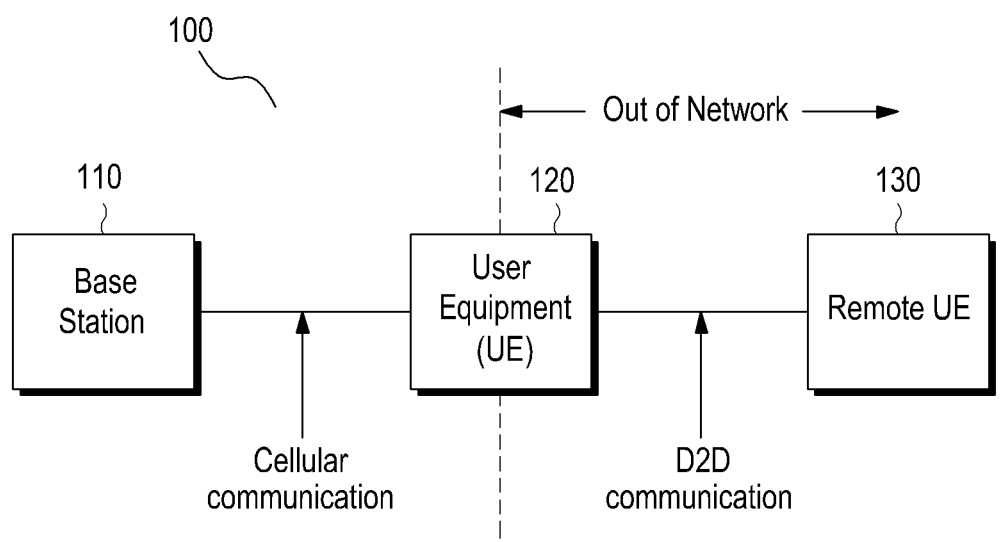
FIG. 1a illustrates a wireless communication network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Prior to describing the embodiments in detail, it is useful to provide definitions for key terms used herein. Unless defined otherwise, all technical terms used herein have the same meaning as commonly understood by a person having ordinary skill in the art to which this invention belongs.

UE-to Network relay: An User Equipment (UE) that provides functionality to support forwarding of traffic (data and/or control) between the remote UE and the network (BS). The UE-to-Network relay is always in coverage of network. Remote UE may be in coverage or out of coverage of network.

Uu link: Refers to wireless link between the UE and the BS.

One of the requirements of Device to Device (D2D) communication is that a remote UE, out of coverage of the network, should be able to communicate with network (base station) via another UE (i.e. UE-to-Network Relay) which is in coverage of the network and is in proximity of remote UE. This is illustrated in FIG. 1. The remote UE communicates with the UE, capable of supporting the UE-to-Network Relay using the D2D communication. The remote UE in coverage of network can also use UE-to-Network Relay to communicate with network to reduce the service interruption when Remote UE is moving from in coverage to out of coverage.

In order to enable the remote UE to discover the UE (i.e., capable of supporting UE-to-Network Relay) the UE transmits (or announces) the UE-to-Network relay indication (i.e. discovery message indicating itself as the UE-to-Network relay) periodically which can be used by the Remote UE to discover the UE-to-Network relay in its proximity. The discovery message is transmitted on the D2D discovery channel. The remote UE interested in searching for the UE-to-Network Relay monitors the D2D discovery channel for receiving the UE-to-Network relay indication (i.e. discovery message indicating itself as the UE-to-Network relay) transmitted by the UE-to-Network Relay in its proximity.

One of the issues in an existing approach is the periodic transmission of UE-to-Network relay indication, by the UE, to indicate that it is UE-to-Network Relay. There may be several UEs having the capability to perform UE-to-Network relay functionality. All of them transmitting UE-to-Network relay indication indicating that they are UE-to-Network Relay periodically is unnecessary and leads to wastage of resources and increased power consumption in UE.

The embodiments herein disclose a method for triggering a transmission of the UE-to-Network relay indication (i.e. discovery message indicating itself as the UE-to-Network relay). Further, the method includes receiving, by the UE, one of UE-to-Network relay criteria broadcasted by the base station. Further, the method includes measuring, at the UE, a link quality parameter between the UE and the base station. Further, the method includes detecting, by the UE, that the link quality parameter meets the UE-to-Network relay criteria. Further, the method includes transmitting, by the UE, a UE-to-Network relay indication (i.e. discovery message indicating itself as the UE-to-Network relay) on a Device to Device (D2D) discovery channel.

In an embodiment, the link quality parameter is at least one of a Reference signal received power (RSRP) and a Reference signal received quality (RSRQ).

In an embodiment, the UE-to-Network relay criteria includes one or more 'a maximum link quality threshold', 'a minimum link quality threshold' 'a maximum hysteresis value' and 'a minimum hysteresis value.

In an embodiment, the UE is in one of a Radio Resource Control (RRC) idle state and a Radio Resource Control (RRC) connected state.

In an embodiment, transmitting, by the UE, the UE-to-Network relay indication (i.e. discovery message indicating itself as the UE-to-Network relay) on the D2D discovery channel includes determining other UE in vicinity which is transmitting the UE-to-Network relay indication on the D2D discovery channel. Further, the method includes measuring a link quality parameter between the UE and the other UE in vicinity. Further, the method includes detecting that the link quality parameter between the UE and the other UE in vicinity meets the UE-to-Network relay criteria. Further, the method includes transmitting the UE-to-Network relay indication (i.e. discovery message indicating itself as the UE-to-Network relay) on the D2D discovery channel.

The embodiments herein disclose a method for triggering a transmission of the UE-to-Network relay indication. Further, the method includes receiving, at the base station, a request message including the link quality parameter between the UE and the base station from the UE. Further, the method includes detecting, at the base station, the link quality parameter meets the UE-to-Network relay criteria. Further, the method includes sending, by the base station, a response message to the UE to trigger the transmission of the UE-to-Network relay indication (i.e. discovery message indicating itself as the UE-to-Network relay) on the D2D discovery channel.

In an embodiment, the link quality parameter is at least one of a Reference signal received power (RSRP) and a Reference signal received quality (RSRQ).

In an embodiment, the UE-to-Network relay criteria includes one or more 'the maximum link quality threshold', 'the minimum link quality threshold', 'the maximum hysteresis value' and 'the minimum hysteresis value.

In an embodiment, the UE is in one of a Radio Resource Control (RRC) idle state and a Radio Resource Control (RRC) connected state.

In an embodiment, the method further includes receiving, at the base station, a request message comprising a link quality parameter between a UE and the base station from the UE. Further, the method includes detecting, at the base station, the link quality parameter does not meet the UE-to-Network relay criteria. Furthermore, the method includes sending, by the base station, a response message to the UE to stop transmission of the UE-to-Network relay indication (i.e. discovery message indicating itself as the UE-to-Network relay) on the D2D discovery channel.

In an embodiment, the method includes receiving, at the base station, the request message including the link quality parameter from the UE includes receiving one of a capability information message and a prose UE information message from the UE. Further, the method includes sending a RRC reconfiguration request to the UE. Furthermore, the method includes receiving a measurement report comprising the link quality parameter from the UE.

Unlike the conventional systems and methods as described in conjunction with the FIG. 1, the proposed method provides a mechanism for triggering the transmission of the UE-to-Network relay indication (i.e. discovery message indicating itself as the UE-to-Network relay). The proposed mechanism includes obtaining the link quality parameter from the base station, measuring the obtained link quality parameter with the UE-to Network relay criteria.

Further, the proposed mechanism addresses the issues such as wastage of resources and increased battery consumption of the UE caused due to continuous broadcasting of data packets (discovery messages/signals) by the UE, capable of supporting the UE-to-Network relay, to the another UE in vicinity thereof.

Referring now to the drawings, and more particularly to FIGS. 1 through 6, where similar reference characters denote corresponding features consistently throughout the figures, there are shown preferred embodiments.

The FIG. 1a illustrates a wireless communication network 100, according to an embodiment as disclosed herein. In an embodiment the wireless communication network 100 includes the UE 120, capable of supporting UE-to-Network relay functionality, the remote UE 130 communicating with the UE 120 using D2D communication, and the base station 110. In an embodiment, the BS 110 can be eNodeB (eNB), an antenna(s), providing services to the UE 120 connected to the base station 110. The services includes, for e.g., telephonic communication, wired/wireless communication, radio services or the like. In an embodiment, the UE 120 can be a laptop, a desktop computer, a mobile phone, a mobile station, a mobile terminal, a smart phone, Personal Digital Assistants (PDAs), a tablet, a phablet, or any other electronic device.

In an embodiment, the remote UE 130 can be a laptop, a desktop computer, a mobile phone, a mobile station, a mobile terminal, a smart phone, Personal Digital Assistants (PDAs), a tablet, a phablet, or any other electronic device which is out of network coverage and may not able to communicate with the network. In another embodiment, remote UE can be in coverage of network.

Figure 1B:
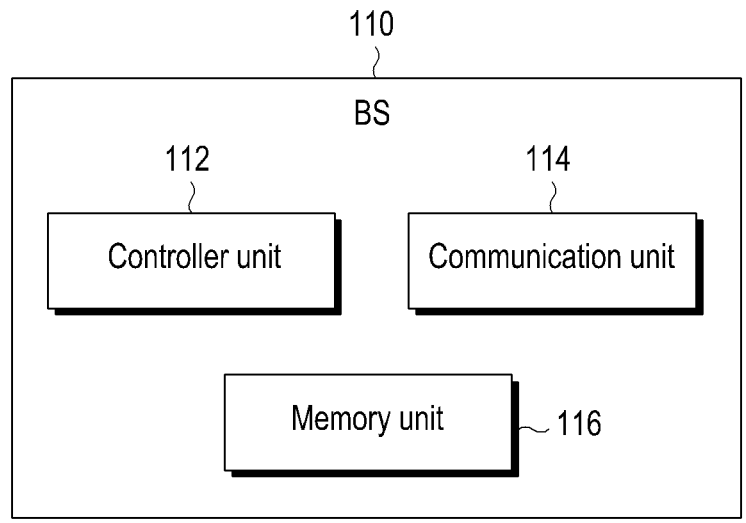
FIG. 1b illustrates various units of a Base station (BS) for triggering a transmission of a UE-to-Network relay indication, according to an embodiment as disclosed herein.

FIG. 1b illustrates various units of the BS 110 for triggering the transmission of the UE-to-Network relay indication, according to an embodiment as disclosed herein. In an embodiment, the BS 120 includes a controller unit 112, a communication unit 114 and a memory unit 116.

The controller unit 112 can be configured to receive the request message comprising the link quality parameter between the UE 120 and the base station 110 from the UE 120. Further, the controller unit 112 can be configured to detect the link quality parameter meets the UE-to-Network relay criteria. Furthermore, the controller unit 112 can be configured to send the response message to the UE 120 to trigger the transmission of UE-to-Network relay indication (i.e. discovery message indicating itself as the UE-to-Network relay) on the D2D discovery channel.

In an embodiment, the controller unit 112 is further configured to receive the request message comprising the link quality parameter between the UE 120 and the base station 110 from the UE 120. Further, the controller unit 112 can be configured to detect the link quality parameter does not meets the UE-to-Network relay criteria. Furthermore, the controller unit 112 can be configured to send the response message to the UE 120 to stop transmission of the UE-to-Network relay indication (i.e. discovery message indicating itself as the UE-to-Network relay) on the D2D discovery channel.

Figure 2A:
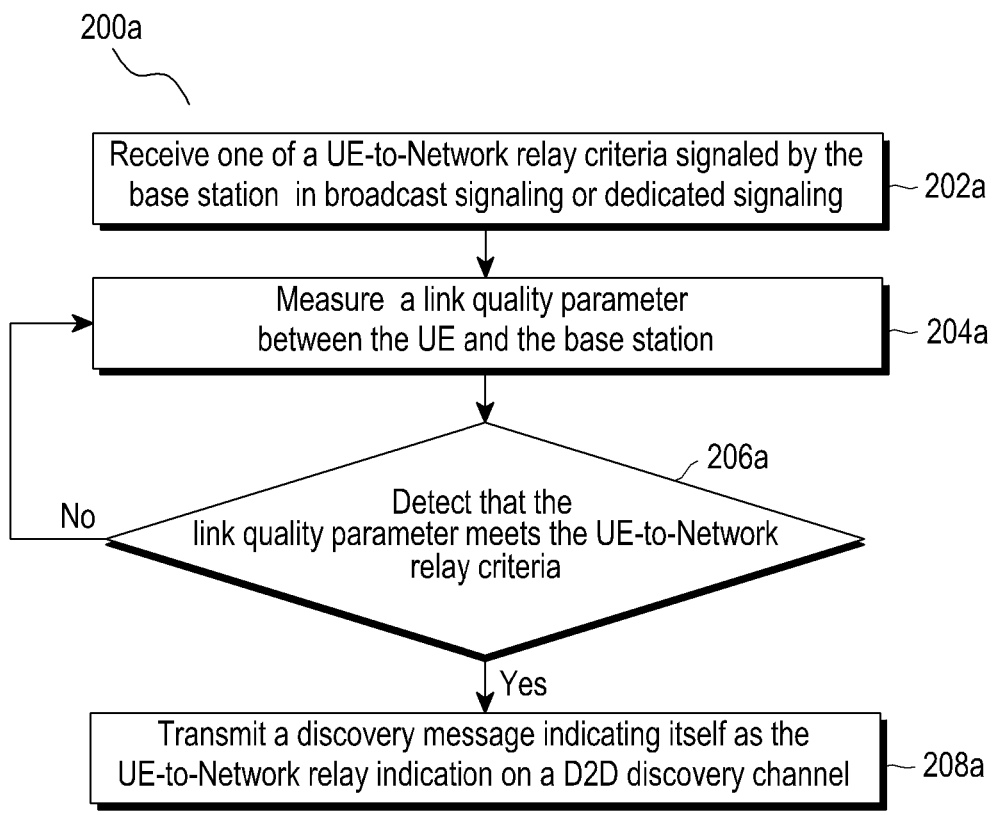
FIG. 2a is a flow diagram illustrating a method for triggering a transmission of a UE-to-Network relay indication, according to an embodiment as disclosed herein.
Figure 2B:
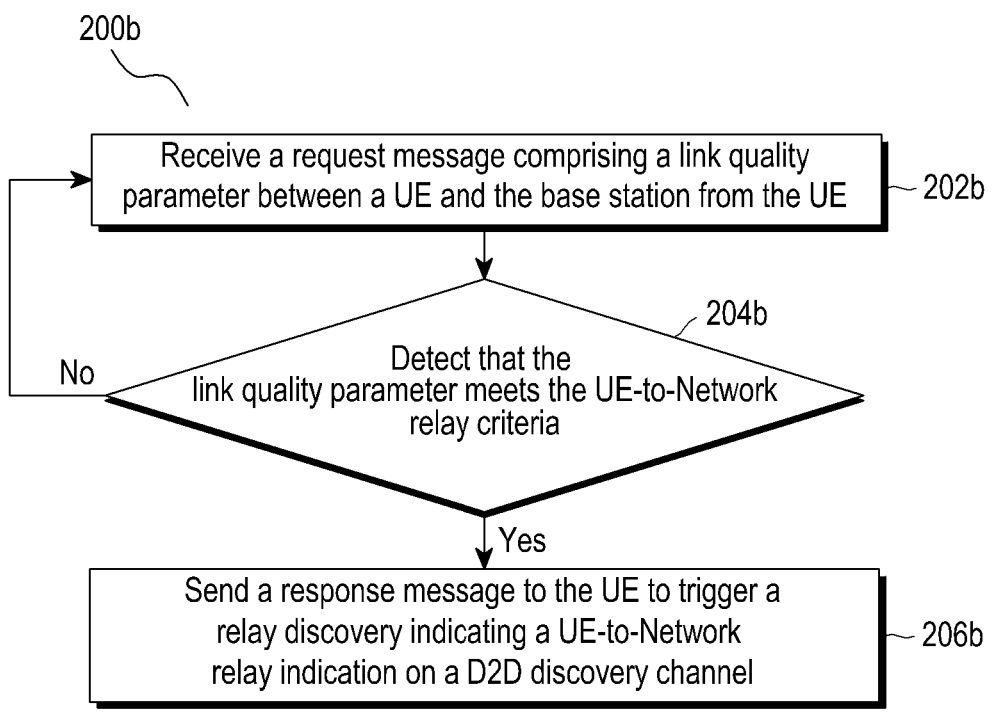
FIG. 2b is another flow diagram illustrating a method for triggering a transmission of a UE-to-Network relay indication, according to an embodiment as disclosed herein.

Further, the instructions executed by the controller unit 112 is explained in conjunction with FIG. 2b In an embodiment, the UE-to-Network relay criteria includes one or more 'the maximum link quality threshold', 'the minimum link quality threshold', 'the maximum hysteresis value' and 'the minimum hysteresis value.

Each of the UE-to-Network relay criteria is detailed below in accordance with the controller unit 112 configured to execute the instructions received.

The maximum link quality threshold and no hysteresis: In an embodiment, the controller unit 112, of the BS 110, receives the link quality parameter (RSRP/RSRQ) of Uu link i.e. wireless link between the UE 120 and the BS 110 of camped cell (or serving cell or primary cell) from the UE 120. If the received RSRP/RSRQ is less than (or less than equal to) a Uu link quality threshold, then the controller unit 112 of the BS 110 sends a response message to the UE 120 to start the discovery procedure. In this embodiment, the Uu Link quality threshold is the 'maximum Uu link quality threshold'. If the BS 110 determines that the UE 120 (through the controller unit 112) is transmitting the UE-to-Network relay indication (i.e. discovery message indicating itself as the UE-to-Network relay) and received RSRP/RSRQ of camped cell (or serving cell or primary cell) becomes greater than (or greater than equal to) to a Uu link quality threshold, then the controller unit 112 sends a response message to the UE 120 to stop transmitting UE-to-Network relay indication (i.e. discovery message indicating itself as the UE-to-Network relay).

The maximum link quality threshold and the hysteresis value applied to start relay discovery: In an embodiment, the controller unit 112 receives the link quality parameter (RSRP/RSRQ) of Uu link i.e. wireless link between the UE 120 and the BS 110 of camped cell (or serving cell or primary cell) from the UE 120. If the received, by the controller unit 112, RSRP/RSRQ of the camped cell (or serving cell or primary cell) is below a Uu link quality threshold by hysteresis value then, the controller unit 112 sends a response message to the UE 120 to trigger the transmission of UE-to-Network relay indication (i.e. discovery message indicating itself as the UE-to-Network relay) on the D2D discovery channel. In this embodiment, the Uu Link quality threshold is the 'maximum Uu link quality threshold' and hysteresis value is 'Maximum Hysteresis Value'. If the controller unit 112 determines that the UE 120 is transmitting UE-to-Network relay indication (i.e. discovery message indicating itself as the UE-to-Network relay) and received RSRP/RSRQ of camped cell (or serving cell or primary cell) becomes above Uu link quality threshold then the controller unit 112 sends a response message, to the UE 120, to stop transmitting UE-to-Network relay indication (i.e. discovery message indicating itself as the UE-to-Network relay).

The maximum link quality threshold and the hysteresis value applied to stop relay discovery: In an embodiment, the controller unit 112 receives the link quality parameter (RSRP/RSRQ) of Uu link i.e. wireless link between the BS 110 and the UE 120 of camped cell (or serving cell or primary cell) from the UE 120. If the received, by the controller unit 112, RSRP/RSRQ of the camped cell (or serving cell or primary cell) is below a Uu link quality threshold then the controller unit 112 sends a response message to the UE 120 to start transmitting UE-to-Network relay indication (i.e. discovery message indicating itself as the UE-to-Network relay) on the D2D discovery channel(s). In this embodiment the Uu Link quality threshold is the 'maximum Uu link quality threshold' and hysteresis value is 'Maximum Hysteresis Value'. If the UE 120 is transmitting UE-to-Network relay indication (i.e. discovery message indicating itself as the UE-to-Network relay) and measured RSRP/RSRQ of camped cell (or serving cell or primary cell) becomes above this signaled Uu link quality threshold by hysteresis value then UE 120 stops transmitting UE-to-Network relay indication (i.e. discovery message indicating itself as the UE-to-Network relay).

The minimum link quality threshold and no hysteresis: In an embodiment, the controller unit 112 receives the link quality parameter (RSRP/RSRQ) of Uu link i.e. wireless link between the UE 120 and the BS 110 of camped cell (or serving cell or primary cell) from the UE 120. If the received RSRP/RSRQ of the camped cell (or serving cell or primary cell) is greater than (or greater than equal to) a Uu link quality threshold then the controller unit 112 sends a response message to the UE 120 to start discovery procedure i.e. to start transmission of UE-to-Network relay indication (i.e. discovery message indicating itself as the UE-to-Network relay) \ on the D2D discovery channel. In this embodiment, the Uu Link quality threshold is the 'minimum Uu link quality threshold'. If the controller unit 112 determines that the UE 120 is transmitting UE-to-Network relay indication (i.e. discovery message indicating itself as the UE-to-Network relay) and the received RSRP/RSRQ of the camped cell (or serving cell or primary cell) becomes less than equal to (or lesser than) Uu link quality threshold then the controller unit 112 sends a response message to the UE 120 to stop transmitting UE-to-Network relay indication (i.e. discovery message indicating itself as the UE-to-Network relay).

The minimum link quality threshold and the hysteresis value applied to start relay discovery: In an embodiment, the controller unit 112 receives the link quality parameter (RSRP/RSRQ) of Uu link from the UE 120. If the received RSRP/RSRQ of the camped cell (or serving cell or primary cell) is above this signaled Uu link quality threshold by hysteresis value then the controller unit 112 sends a response message to the UE 120 to start discovery procedure i.e. start transmission of UE-to-Network relay indication (i.e. discovery message indicating itself as the UE-to-Network relay) on the D2D discovery channel. In this embodiment, the Uu Link quality threshold is the 'minimum Uu link quality threshold' and hysteresis value is 'Minimum Hysteresis Value'. If the controller unit 112 determines that the UE 120 is transmitting the UE-to-Network relay indication (i.e. discovery message indicating itself as the UE-to-Network relay) and the measured RSRP/RSRQ of the camped cell (or serving cell or primary cell) becomes below Uu link quality threshold then the controller unit 112 sends a response message to the UE 120 to stop transmitting UE-to-Network relay indication (i.e. discovery message indicating itself as the UE-to-Network relay).

The minimum link quality threshold and the hysteresis value applied to stop relay discovery: In an embodiment, the controller unit 112 of the UE 120 receives the link quality parameter (RSRP/RSRQ) of Uu link from UE 120. If the received RSRP/RSRQ of the camped cell (or serving cell or primary cell) is above a Uu link quality threshold then the controller unit 112 sends a response message to the UE 120 to start discovery procedure i.e. start transmission of UE-to-Network relay indication (i.e. discovery message indicating itself as the UE-to-Network relay) on the D2D discovery channel. In this embodiment the Uu Link quality threshold is the minimum Uu link quality threshold and hysteresis value is 'Minimum Hysteresis Value'. If the controller unit 112 determines that the UE 120 is transmitting UE-to-Network relay indication (i.e. discovery message indicating itself as the UE-to-Network relay) and the measured RSRP/RSRQ of camped cell (or serving cell or primary cell) becomes below Uu link quality threshold by hysteresis value then the controller unit 112 sends a response message to the UE 120 to stop transmitting UE-to-Network relay indication (i.e. discovery message indicating itself as the UE-to-Network relay).

The minimum link quality threshold, the maximum link quality threshold and no hysteresis: In an embodiment, the controller unit 112 receives the link quality parameter (RSRP/RSRQ) of Uu link from UE 120. If the received RSRP/RSRQ of the camped cell (or serving cell or primary cell) is between two thresholds (Threshold 2<measured RSRP/RSRQ<Threshold 1 or Threshold 2<=measured RSRP/RSRQ<=Threshold 1) then the controller unit 112 sends a response message to the UE 120 to start discovery procedure i.e. start transmission of UE-to-Network relay indication (i.e. discovery message indicating itself as the UE-to-Network relay) on the D2D discovery channel. If the controller unit 112 determines that the UE 120 is transmitting UE-to-Network relay indication (i.e. discovery message indicating itself as the UE-to-Network relay) and the received RSRP/RSRQ of the camped cell (or serving cell or primary cell) does not meet above condition then the controller unit 112 sends a response message to the UE 120 to stop transmitting UE-to-Network relay indication (i.e. discovery message indicating itself as the UE-to-Network relay).

The minimum link quality threshold, the maximum link quality threshold and the hysteresis values applied to start relay discovery: In an embodiment, the controller unit 112 receives the link quality parameter (RSRP/RSRQ) of Uu link i.e. wireless link between the BS 110 and the UE 120 of camped cell (or serving cell or primary cell) from UE 120. If the received RSRP/RSRQ of cell (camped/serving/primary) is above threshold 2 by max hysteresis value and below threshold 1 by min hysteresis value then the controller unit 112 sends a response message to the UE 120 to start discovery procedure i.e. start transmission of UE-to-Network relay indication (i.e. discovery message indicating itself as the UE-to-Network relay) on the D2D discovery channel. If the controller unit 112 determines that the UE 120 is transmitting UE-to-Network relay indication (i.e. discovery message indicating itself as the UE-to-Network relay) and the measured RSRP/RSRQ of the cell (camped/serving/primary) is above threshold 1 or is below threshold 2 then the controller unit 112 sends a response message to the UE 120 to stop transmitting UE-to-Network relay indication (i.e. discovery message indicating itself as the UE-to-Network relay).

The minimum link quality threshold, the maximum link quality threshold and the hysteresis values applied to stop relay discovery: In an embodiment, the controller unit 112 receives the link quality parameter (RSRP/RSRQ) of Uu link i.e. wireless link between the BS 110 and the UE 120 of camped cell (or serving cell or primary cell) from UE 120. If the received RSRP/RSRQ of cell (camped/serving/primary) is above threshold 2 and below threshold 1 then the controller unit 112 sends a response message to the UE 120 to start discovery procedure i.e. start transmission of UE-to-Network relay indication (i.e. discovery message indicating itself as the UE-to-Network relay) on the D2D discovery channel. If the controller unit 112 determines that the UE 120 is transmitting UE-to-Network relay indication (i.e. discovery message indicating itself as the UE-to-Network relay) and the measured RSRP/RSRQ of the cell (camped/serving/primary) is above threshold 1 by max hysteresis value or is below threshold 2 by minimum hysteresis value then the controller unit 112 sends a response message to the UE 120 to stop transmitting UE-to-Network relay indication (i.e. discovery message indicating itself as the UE-to-Network relay).

Further, the memory unit 116 may include one or more computer-readable storage media. The memory unit 116 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 116 may, in some examples, be considered a non-transitory storage medium. The term "non-transitory" may indicate that the storage medium is not embodied in a carrier wave or a propagated signal. However, the term "non-transitory" should not be interpreted that the memory unit 116 is non-movable. In some examples, the memory unit 116 can be configured to store larger amounts of information than the memory. In certain examples, a non-transitory storage medium may store data that can, over time, change (e.g., in Random Access Memory (RAM) or cache). The communication unit 114 can be configured for communicating internally between the units and externally with the networks.

The FIG. 1b shows exemplary units of the BS 110 but it is to be understood that other embodiments are not limited thereon. In other embodiments, the BS 110 may include less or more number of units. Further, the labels or names of the units are used only for illustrative purpose and does not limit the scope of the invention. One or more units can be combined together to perform same or substantially similar function in the BS 110.

Figure 1C:
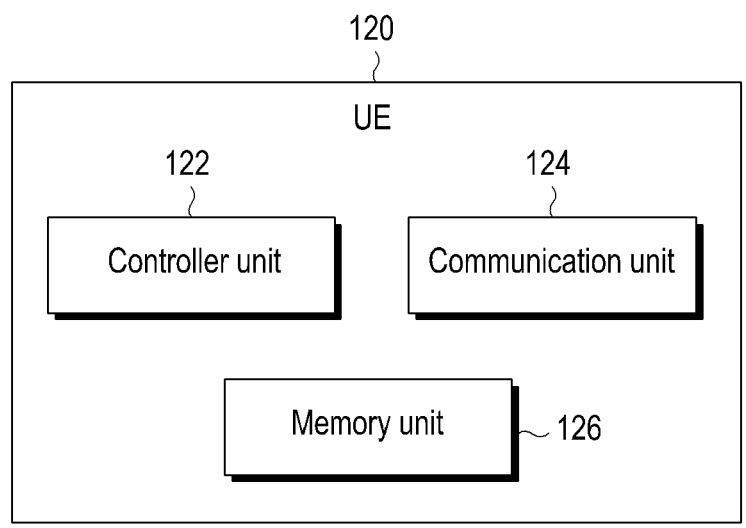
FIG. 1c illustrates various units of a User Equipment (UE) for triggering a transmission of a UE-to-Network relay indication, according to an embodiment as disclosed herein.

FIG. 1c illustrates various units of the UE 120 for triggering the transmission of the UE-to-Network relay indication (i.e. discovery message indicating itself as the UE-to-Network relay), according to an embodiment as disclosed herein. In an embodiment, the UE 120 includes a controller unit 122, a communication unit 124 and a memory unit 126.

Unlike the conventional systems and methods, as disclosed in the FIG. 1a. The controller unit 122 can be configured to receive one of the UE-to-Network relay criteria broadcasted by the base station 110. Further, the controller unit 122 is configured to measure the link quality parameter between the UE 120 and the base station 110. Further, the controller unit 122 is configured to detect that the link quality parameter meets the UE-to-Network relay criteria. Further, the controller unit 122 is configured to transmit the UE-to-Network relay indication (i.e. discovery message indicating itself as the UE-to-Network relay) on the D2D discovery channel.

The UE-to-Network relay criteria include one or more 'the maximum link quality threshold', 'the minimum link quality threshold', 'the maximum hysteresis value' and 'the minimum hysteresis value.

Each of the UE-to-Network relay criteria is detailed below in accordance with the controller unit 122 configured to execute the instructions received. Further, the instructions executed by the controller unit 122 are elucidated in conjunction with the FIG. 2a.

The maximum link quality threshold and no hysteresis: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the link quality threshold from the BS 110. The BS 110 broadcast the Uu Link quality threshold or sends the Uu Link quality threshold to UE 120 in dedicated signaling. The UE 120 starts or stops the relay discovery procedure based on the received Uu Link quality threshold. If the measured RSRP/RSRQ of the camped cell (or serving cell or primary cell) is less than (or less than equal to) the Uu link quality threshold received from the BS 110 then the controller unit 122 of the UE 120 starts relay discovery procedure i.e. it starts transmitting the UE-to-Network relay indication (discovery message indicating itself as the UE-to-Network relay), on the D2D discovery channel. In this embodiment, the signaled Uu Link quality threshold by the BS 110 is the 'maximum Uu link quality threshold'. If the UE 120 (through the controller unit 122) is transmitting UE-to-Network relay indication (i.e. discovery message indicating itself as the UE-to-Network relay) and measured RSRP/RSRQ of camped cell (or serving cell or primary cell) becomes greater than (or greater than equal to) the Uu link quality threshold received from the BS 110 then the controller unit 122 stops transmitting the UE-to-Network relay indication (i.e. discovery message indicating itself as the UE-to-Network relay).

The maximum link quality threshold and the hysteresis value applied to start relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the link quality threshold and hysteresis value from the BS 110. In an embodiment, the BS 110 broadcasts the Uu Link quality threshold and hysteresis value or sends the Uu Link quality threshold and hysteresis value to UE 120 in dedicated signaling. If the measured RSRP/RSRQ of the camped cell (or serving cell or primary cell) is below Uu link quality threshold by hysteresis value then UE 120 (i.e., the controller unit 122) starts relay discovery procedure i.e. it starts transmitting the UE-to-Network relay indication (i.e. discovery message indicating itself as the UE-to-Network relay) on the D2D discovery channel. In this embodiment the Uu Link quality threshold is the 'maximum Uu link quality threshold' and hysteresis value is 'Maximum Hysteresis Value'. If the UE 120 is transmitting UE-to-Network relay indication (i.e. discovery message indicating itself as the UE-to-Network relay) and measured RSRP/RSRQ of camped cell (or serving cell or primary cell) becomes above Uu link quality threshold then UE 120 stops transmitting the UE-to-Network relay indication (i.e. discovery message indicating itself as the UE-to-Network relay).

In an embodiment, for example, even when the UE 120 initiates the transmission of the discovery message indicating itself as UE-to-Network relay on the D2D discovery channel, the UE 120 continue measuring the link quality parameter (RSRP/RSRQ) thereon. If the link quality parameter becomes above this signaled Uu link quality threshold then UE 120 stops transmitting discovery messages indicating itself as UE-to-Network relay.

Thus, as the distance from the UE 120 and the BS 110 increases the link quality parameter becomes below the signaled Uu link quality, similarly as the UE 120 distance from the BS 110 increases the link quality parameter becomes above this signaled Uu link quality. Hence, based on the measured link quality the UE 120 can start or stop the transmission of UE-to-network relay indication on the D2D discovery channel(s).

The maximum link quality threshold and the hysteresis value applied to stop relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the link quality threshold and hysteresis value from the BS 110. In an embodiment, the BS 110 broadcasts the Uu Link quality threshold and hysteresis value or sends the Uu Link quality threshold and hysteresis value to UE 120 in dedicated signaling. If the measured RSRP/RSRQ of the camped cell (or serving cell or primary cell) is below this signaled Uu link quality threshold then UE 120 (i.e., the controller unit 122) starts relay discovery procedure i.e. it starts transmitting the UE-to-Network relay indication (i.e. discovery message indicating itself as the UE-to-Network relay) on the D2D discovery channel. In this embodiment the signaled Uu Link quality threshold is the 'maximum Uu link quality threshold' and hysteresis value is 'Maximum Hysteresis Value'. If the UE 120 is transmitting the UE-to-Network relay indication (i.e. discovery message indicating itself as the UE-to-Network relay) and measured RSRP/RSRQ of camped cell (or serving cell or primary cell) becomes above this signaled Uu link quality threshold by hysteresis value then UE 120 stops transmitting UE-to-Network relay indication (i.e. discovery message indicating itself as the UE-to-Network relay).

The minimum link quality threshold and no hysteresis: In an embodiment, the controller unit 122 of the UE 120 measures the link quality parameter (RSRP/RSRQ) of Uu link i.e. wireless link between the UE 120 and the BS 110 of camped cell (or serving cell or primary cell). UE 120 receives the link quality threshold from the BS 110. In an embodiment, the BS 110 broadcasts Uu Link quality threshold or sends the Uu Link quality threshold to UE 120 in dedicated signaling. If the measured RSRP/RSRQ of the camped cell (or serving cell or primary cell) is greater than (or greater than equal to) this signaled Uu link quality threshold then UE 120 starts relay discovery procedure i.e. it starts transmitting the UE-to-Network relay indication (i.e. discovery message indicating itself as the UE-to-Network relay) on the D2D discovery channel. In this embodiment signaled Uu Link quality threshold is the 'minimum Uu link quality threshold'. If the UE 120 is transmitting the UE-to-Network relay indication (i.e. discovery message indicating itself as the UE-to-Network relay) and the measured RSRP/RSRQ of the camped cell (or serving cell or primary cell) becomes less than equal to (or lesser than) this signaled Uu link quality threshold then UE 120 stops transmitting the UE-to-Network relay indication (i.e. discovery message indicating itself as the UE-to-Network relay).

The minimum link quality threshold and the hysteresis value applied to start relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the link quality threshold and hysteresis value from the BS 110. In an embodiment, the BS 110 broadcasts the Uu Link quality threshold and hysteresis value or sends the Uu Link threshold and hysteresis value to UE 120 in dedicated signaling. If the measured RSRP/RSRQ of the camped cell is above the Uu link quality threshold by hysteresis value then the UE 120 starts relay discovery procedure i.e. it starts transmitting the UE-to-Network relay indication (i.e. discovery message indicating itself as the UE-to-Network relay) on the D2D discovery channel. In this embodiment the signaled Uu Link quality threshold is the 'minimum Uu link quality threshold' and hysteresis value is 'Minimum Hysteresis Value'. If the UE 120 is transmitting the UE-to-Network relay indication (i.e. discovery message indicating itself as the UE-to-Network relay) and the measured RSRP/RSRQ of the camped cell (or serving cell or primary cell) becomes below this signaled Uu link quality threshold then the UE 120 stops transmitting the UE-to-Network relay indication (i.e. discovery message indicating itself as the UE-to-Network relay).

The minimum link quality threshold and the hysteresis value applied to stop relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the link quality threshold and hysteresis value from the BS 110. In an embodiment, the BS 110 broadcasts the Uu Link quality threshold and hysteresis value or sends the Uu Link threshold and hysteresis value to UE 120 in dedicated signaling. If the measured RSRP/RSRQ of the camped cell (or serving cell or primary cell) is above the Uu link quality threshold then the UE 120 starts relay discovery procedure i.e. it starts transmitting the UE-to-Network relay indication (i.e. discovery message indicating itself as the UE-to-Network relay) on the D2D discovery channel. In this embodiment the signaled Uu Link quality threshold is the minimum Uu link quality threshold and hysteresis value is 'Minimum Hysteresis Value'. If the UE 120 is transmitting the UE-to-Network relay indication (i.e. discovery message indicating itself as the UE-to-Network relay) and the measured RSRP/RSRQ of camped cell (or serving cell or primary cell) becomes below this signaled Uu link quality threshold by hysteresis value then the UE 120 stops transmitting the UE-to-Network relay indication (i.e. discovery message indicating itself as the UE-to-Network relay).

The minimum link quality threshold, the maximum link quality threshold and no hysteresis: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the maximum Uu Link quality threshold (Threshold 1) and minimum Uu Link quality threshold (threshold 2) from the BS 110. The UE 120 starts or stops the relay discovery procedure based on these thresholds. In an embodiment, the BS 110 broadcasts maximum Uu Link quality threshold (Threshold 1) and minimum Uu Link quality threshold (threshold 2) or sends maximum Uu Link quality threshold (Threshold 1) and minimum Uu Link quality threshold (threshold 2) to UE 120 in dedicated signaling. If the measured RSRP/RSRQ of the camped cell (or serving cell or primary cell) is between two thresholds (Threshold 2<measured RSRP/RSRQ<Threshold 1 or Threshold 2<=measured RSRP/RSRQ<=Threshold 1) then the UE 120 starts the relay discovery procedure i.e. it starts transmitting the UE-to-Network relay indication (i.e. discovery message indicating itself as the UE-to-Network relay) on the D2D discovery channel. If the UE 120 is transmitting the UE-to-Network relay indication (i.e. discovery message indicating itself as the UE-to-Network relay) and the measured RSRP/RSRQ of the camped cell (or serving cell or primary cell) does not meet above condition then the UE 120 stops transmitting the UE-to-Network relay indication (i.e. discovery message indicating itself as the UE-to-Network relay).

The minimum link quality threshold, the maximum link quality threshold and the hysteresis values applied to start relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). The UE 120 receives the maximum Uu Link quality threshold (Threshold 1), max hysteresis value, minimum Uu Link quality threshold (threshold 2) and min hysteresis value from the BS 110. The UE 120 starts or stops the relay discovery procedure based on these thresholds. In an embodiment, the BS 110 broadcasts the maximum Uu Link quality threshold (Threshold 1), max hysteresis value, minimum Uu Link quality threshold (threshold 2) and minimum hysteresis value, or sends the maximum Uu Link quality threshold (Threshold 1), max hysteresis value, minimum Uu Link quality threshold (threshold 2) and minimum hysteresis value to UE 120 in dedicated signaling. If the measured RSRP/RSRQ of cell (camped/serving/primary) is above threshold 2 by minimum hysteresis value and below threshold 1 by maximum hysteresis value then the UE 120 starts relay discovery procedure i.e. it starts transmitting the UE-to-Network relay indication (i.e. discovery message indicating itself as the UE-to-Network relay) on the D2D discovery channel. If the UE 120 has started transmitting the UE-to-Network relay indication (i.e. discovery message indicating itself as the UE-to-Network relay) and the measured RSRP/RSRQ of the cell (camped/serving/primary) is below threshold 1 and is above threshold 2 then the UE 120 continues transmitting information indicating itself as the UE-to-Network relay. If the UE 120 is transmitting the UE-to-Network relay indication (i.e. discovery message indicating itself as the UE-to-Network relay) and the measured RSRP/RSRQ of the cell (camped/serving/primary) is above threshold 1 or is below threshold 2 then the UE 120 stops transmitting the UE-to-Network relay indication (i.e. discovery message indicating itself as the UE-to-Network relay).

The minimum link quality threshold, the maximum link quality threshold and the hysteresis values applied to stop relay discovery: In an embodiment, the controller unit 122 of the UE 120 measures the link quality parameter (RSRP/RSRQ) of Uu link i.e. wireless link between the UE 120 and the BS 110 of camped cell (or serving cell or primary cell). UE 120 receives the maximum Uu Link quality threshold (Threshold 1), max hysteresis value, minimum Uu Link quality threshold (threshold 2) and min hysteresis value from the BS 110. The UE 120 starts or stops the relay discovery procedure based on these thresholds. In an embodiment, the BS 110 broadcasts maximum Uu Link quality threshold (Threshold 1), max hysteresis value, minimum Uu Link quality threshold (threshold 2) and minimum hysteresis value, or sends the maximum Uu Link quality threshold (Threshold 1), max hysteresis value, minimum Uu Link quality threshold (threshold 2) and minimum hysteresis value to the UE 120 in dedicated signaling. If the measured RSRP/RSRQ of cell (camped/serving/primary) is above threshold 2 and below threshold 1 then the UE 120 starts relay discovery procedure i.e. it initiates transmitting the UE-to-Network relay indication (i.e. discovery message indicating itself as the UE-to-Network relay) on the D2D discovery channel. If the UE 120 is transmitting the UE-to-Network relay indication (i.e. discovery message indicating itself as the UE-to-Network relay) and the measured RSRP/RSRQ of the camped cell is above threshold 1 by max hysteresis value or is below threshold 2 by minimum hysteresis value then the UE 120 stops transmitting the UE-to-Network relay indication (i.e. discovery message indicating itself as the UE-to-Network relay).

For example, when the UE 120 is in the coverage of the cell, the UE 102 can be in two states 1. In the RRC idle state and 2. In the RRC connected state. In the RRC idle state the UE 120 monitors system information broadcasted in the camped cell and paging information. The UE 120 in RRC connected state dedicated connection exists between UE 120 and BS 110. UE 120 can transmit as well as receive from base station 110. Also, in the RRC connected state the UE 120 receives a dedicated signaling from the base station 110.

In an embodiment, according to the proposed mechanism the UE 120 triggers the transmission of the UE-to-Network relay indication in both the states as described below.

In an embodiment, if the UE 120 is in the RRC idle state and UE's serving cell is suitable as defined in 3GPP TS 36.304 and if the BS 110 indicates that relay (i.e., the UE-to-Network relay) is supported (e.g. presence of relay discovery configuration in system information broadcasted by the BS 110 indicates that UE-to-Network relay operation is supported) and broadcasts Uu link quality thresholds and broadcasts TX resource pools for discovery message transmission then the UE 120 uses the broadcasted TX resource pools for relay discovery for transmitting the discovery message when the UE-to-Network relay criteria (as detailed above) for transmitting the UE-to-Network relay indication (i.e. discovery message indicating itself as the UE-to-Network relay).

In an embodiment UE 120 may comprise of access stratum (AS) and Non Access Stratum (NAS) layers. NAS is also referred as upper layer. Discovery messages are generated by NAS layer. In this case, if the UE 120 is in the RRC idle state and UE's serving cell is suitable as defined in 3GPP TS 36.304 and if the BS 110 indicates that relay (i.e., the UE-to-Network relay) is supported (e.g. presence of relay discovery configuration in system information broadcasted by the BS 110 indicates that UE-to-Network relay operation is supported) and broadcasts Uu link quality thresholds and broadcasts TX resource pools for discovery message transmission and the UE-to-Network relay criteria (as detailed above) is met then the Access Stratum in UE 120 inform the upper layer that it is configured with radio resources that can be used for transmitting relay discovery message. Upper layer then start transmission of UE-to-Network relay indication (i.e. discovery message indicating itself as the UE-to-Network relay).

If the UE 120 is in the RRC idle state and if the BS 110 indicates that relay is supported (e.g. presence of relay discovery configuration in system information broadcasted by the BS 110 indicates that UE-to-Network relay operation is supported) and broadcasts Uu link quality thresholds and does not broadcasts TX resource pools for the discovery message transmission then the UE 120 enter the RRC connected state and initiate request for the discovery resources for transmitting the discovery message, when the UE-to-Network criteria (as explained earlier) for initiating the transmission of the UE-to-Network relay indication (i.e. discovery message indicating itself as the UE-to-Network relay) is met.

In an embodiment, if the UE 120 is in the RRC connected state and if the BS 110 indicates that relay is supported (e.g. presence of Uu link quality thresholds for relay initiation in system information broadcasted by the BS 110 indicates that UE-to-Network relay operation is supported) then the UE 120 initiate request for relay discovery resources for transmitting the discovery message, when the UE-to-Network criteria (as detailed above) for initiating transmission of the UE-to-Network relay indication (i.e. discovery message indicating itself as the UE-to-Network relay) is met.

In an embodiment, if the UE 120 is in the RRC idle state and if the BS 110 indicates that relay (i.e., the UE-to-Network relay) is supported (e.g. presence of Uu link quality thresholds for relay initiation in system information broadcasted by the BS 110 indicates that UE-to-Network relay operation is supported) and the UE-to-Network relay criteria (as detailed above) for initiating transmission of the UE-to-Network relay indication (i.e. discovery message indicating itself as the UE-to-Network relay) is met then UE initiates RRC connection and after transitioning to RRC connected state UE 120 initiate request for relay discovery resources for transmitting the discovery message. In this embodiment, UE 120 is not allowed to transmit the discovery information in RRC idle state. This reduced interruption time. Remote UE connects to UE-to-Network relay after searching the relay. UE-to-Network relay then transition from idle to connected state for relay operation. This leads to interruption. Allowing transmission of discovery information in RRC connected state only ensures that UE to Network relay is already in RRC connected state when Remote UE connects to UE to Network relay.

In an embodiment, the UE 120 may comprise of access stratum (AS) and Non Access Stratum (NAS) layers. NAS is also referred as upper layer. Discovery messages are generated by NAS layer. If the UE 120 is in the RRC connected state and discovery transmission resources are configured by BS 110 in dedicated signaling then the Access Stratum in UE 120 inform the upper layer that it is configured with radio resources that can be used for transmitting relay discovery message. Upper layer then start transmission of UE-to-Network relay indication (i.e. discovery message indicating itself as the UE-to-Network relay). The controller unit 122 is further configured to determine other UE in vicinity which is indicating UE-to-Network relay indication on the D2D discovery channel. Further, the controller unit 122 is configured to measure the link quality parameter between the UE 120 and the other UE in the vicinity. Further, the controller unit 122 is configured to detect that the link quality parameter between the UE 120 and the other UE in vicinity meets the UE-to-Network relay criteria (as detailed above with the difference that link quality measurement is between UE 120 and other UE and not between UE 120 and BS 110). Furthermore, the controller unit 122 is configured to transmit the UE-to-Network relay indication (i.e. discovery message indicating itself as the UE-to-Network relay) on the D2D discovery channel.

The FIG. 2a is a flow diagram illustrating the method for triggering the transmission of the UE-to-Network relay indication, according to an embodiment as disclosed herein. At step 202a, the method 200a includes receiving one of the UE-to-Network relay criteria signaled by the base station 110 in broadcast signaling or dedicated signaling. In an embodiment, the method 200a allows the controller unit 122 to receive one of the UE-to-Network relay criteria signaled by the base station 110 in broadcast signaling or dedicated signaling.

At step 204a, the method 200a includes measuring the link quality parameter of the wireless link between the UE 120 and the base station 110. In an embodiment, the method 200a allows the controller unit 122 to measure the link quality parameter of the wireless link between the UE 120 and the base station 110.

At step 206a, the method 200a includes detecting that the link quality meets the UE-to-Network relay criteria (as detailed above). In an embodiment, the method 200a allows the controller unit 122 to detect that the link quality meets the UE-to-Network relay criteria.

If the link quality meets the UE-to-Network relay criteria thereon at step 208a, the method 200a includes transmitting the discovery message indicating the UE-to-Network relay indication on the D2D discovery channel. In an embodiment, the method 208a allows the controller unit 122 to transmit the UE-to-Network relay indication (i.e. discovery message indicating itself as the UE-to-Network relay) on the D2D discovery channel.

The various actions, acts, blocks, steps, or the like in the method 200a may be performed in the order presented, in a different order or simultaneously. Further, in some embodiments, some of the actions, acts, blocks, steps, or the like may be omitted, added, modified, skipped, or the like without departing from the scope of the invention. In one embodiment, for example, the above steps are executed by UE which has the UE-to-Network capability; UE is in coverage of network and is interested to provide UE-to-Network relay functionality to other UE. In another embodiment the above steps are executed by UE which has the UE-to-Network capability, UE is in coverage of network, UE is interested to provide UE-to-Network relay functionality and has received a discovery message from UE wherein the discovery message indicate that UE is searching for UE-to-Network Relay.

FIG. 2b is another flow diagram illustrating the method for triggering the transmission of the UE-to-Network relay indication, according to an embodiment as disclosed herein. At step 202b, the method 200b includes receiving the request message including the link quality parameter between the UE 120 and the base station 110 from the UE 120. In an embodiment, the method 200b allows the controller unit 112 to receive the request message including the link quality parameter between the UE 120 and the base station 110 from the UE 120.

At step 204b, the method 200b includes detecting the link quality parameter meets the UE-to-Network relay criteria. In an embodiment, the method 200b allows the controller unit 112 to detect the link quality parameter meets the UE-to-Network relay criteria.

If the link quality parameter meets the UE-to-Network relay criteria thereon, at step 206b, the method 200b includes sending the response message to the UE 120 to trigger the transmission of UE-to-Network relay indication (i.e. discovery message indicating itself as the UE-to-Network relay) on the D2D discovery channel. In an embodiment, the method 200b allows the controller unit to send the response message to the UE 120 to trigger the transmission of UE-to-Network relay indication (i.e. discovery message indicating itself as the UE-to-Network relay) on the D2D discovery channel.

The various actions, acts, blocks, steps, or the like in the method 200b may be performed in the order presented, in a different order or simultaneously. Further, in some embodiments, some of the actions, acts, blocks, steps, or the like may be omitted, added, modified, skipped, or the like without departing from the scope of the invention.

Figure 3:
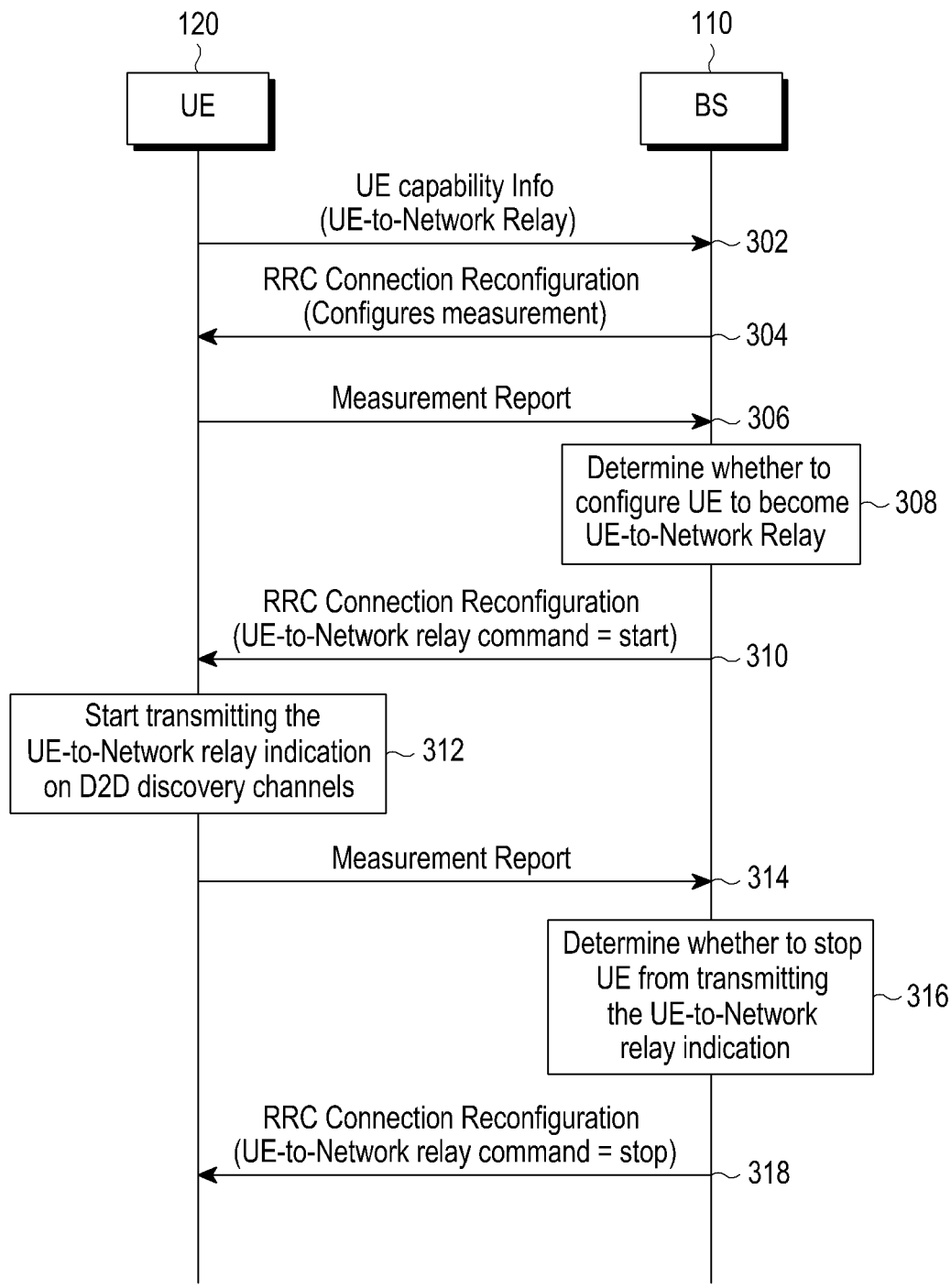
FIG. 3 is a sequence diagram illustrating various signaling messages between a UE and a BS for triggering a transmission of a UE-to-Network relay indication, according to an embodiment as disclosed herein.

FIG. 3 is a sequence diagram illustrating various signaling messages between the UE 120 and the BS 110 for triggering the transmission of the UE-to-Network relay indication, according to an embodiment as disclosed herein. Initially, the UE 120 transmits the UE capability information (i.e. capability information includes whether or not the UE 120 is capable of supporting UE-to-Network relay) (302) to the BS 110. The BS 110, thereon, configures measurement (304) to the UE 120 by sending RRC connection Reconfiguration message, capable of supporting UE-to-Network Relay functionality. The measurement configuration may include frequency to measure, measurement parameters, trigger to send measurement report, and the like.

The UE 120 performs Uu link quality measurement according to measurement configuration. The UE 120 generates a measurement report. The measurement report includes, for example, the link quality parameters, between the UE 120 and the BS 110, measured by the UE 120, and the like.

The UE 120 sends (306) the measurement report to the BS 110 thereon the BS 110 determines (308) if the reported RSRP/RSRQ (the link quality parameters) in the measurement report meets the UE-to-Network relay criteria (as detailed above in accordance with the controller unit 112) then the BS 110 commands (310) the UE 120 supporting the UE-to-Network Relay functionality to start transmitting the UE-to-Network relay indication (i.e. discovery message indicating itself as the UE-to-Network relay) on the D2D discovery channel (312).

The UE 120 is transmitting the UE-to-Network relay indication (i.e. discovery message indicating itself as the UE-to-Network relay) and continues Uu link quality measurement and measurement reporting (314) according to measurement configuration.

The BS 110, therefore, determines (316) whether to stop the UE 120 from transmitting the UE-to-Network relay indication (i.e. discovery message indicating itself as the UE-to-Network relay) based on the measurement report from the UE 120 (i.e., If the reported RSRP/RSRQ in the measurement report does not meet the UE-to-Network relay criteria (as detailed above) then the BS 110 commands (318) the UE 120, supporting the UE-to-Network Relay functionality, to stop transmitting the UE-to-Network relay indication (i.e. discovery message indicating itself as the UE-to-Network relay) on the D2D discovery channel.

In an embodiment, if the UE-to-Network relay criteria is broadcasted in system information and the UE 120 is in the RRC connected state then the UE 120 follows the UE-to-Network relay criteria based trigger when the command to start/stop transmitting the UE-to-Network relay indication (i.e. discovery message indicating itself as the UE-to-Network relay) is not sent to the UE 120 from the BS 110.

Figure 4:
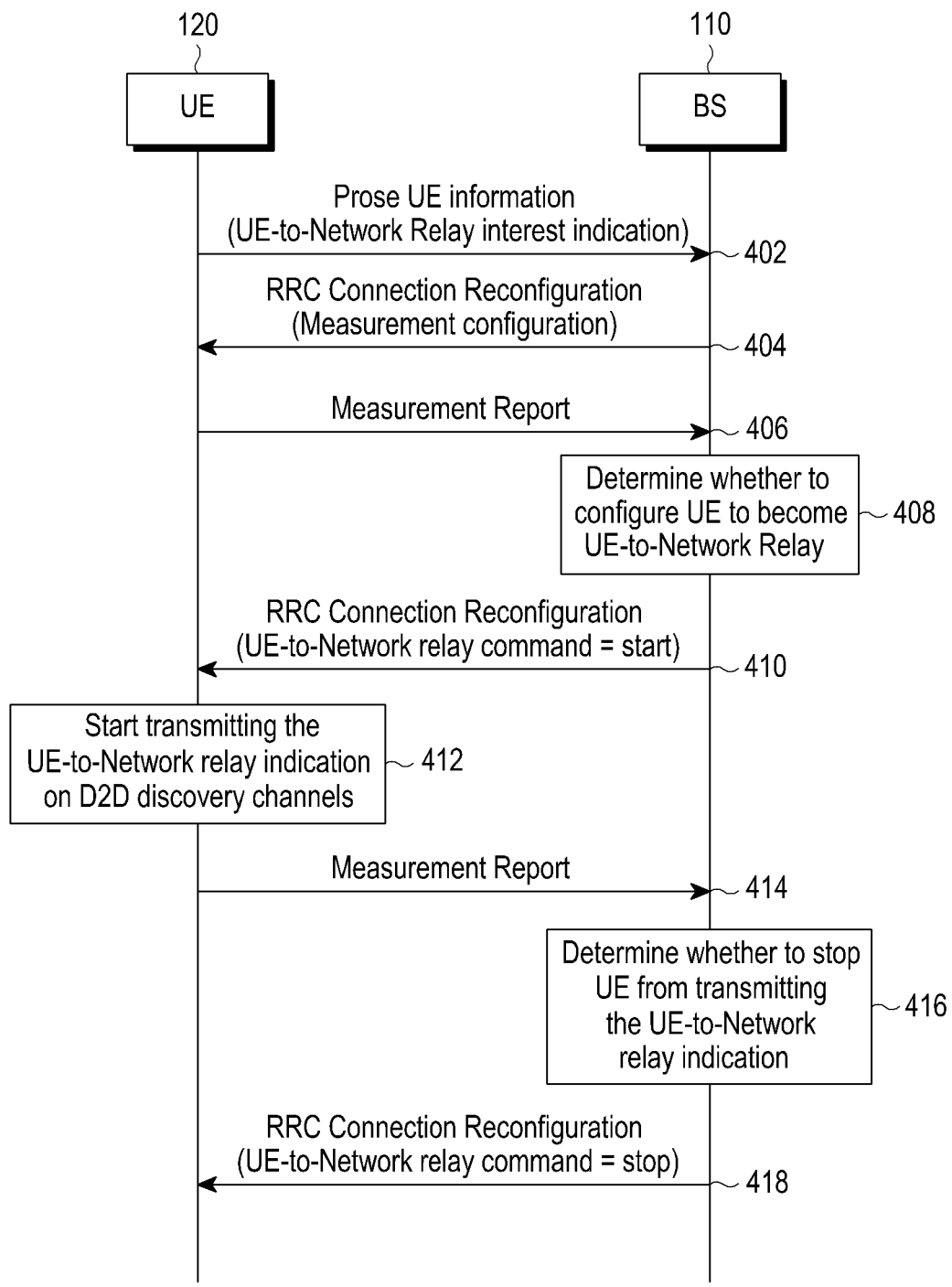
FIG. 4 is another sequence diagram illustrating various signaling messages between a UE and BS (eNB) for triggering a transmission of a UE-to-Network relay indication, according to an embodiment as disclosed herein.

The FIG. 4 is another sequence diagram illustrating various signaling messages between the UE 120, willing to perform the UE-to-Network relay functionality, and the BS 110 for triggering the transmission of the UE-to-Network relay indication, according to an embodiment as disclosed herein. Initially, the UE 120 transmits (402) a Prose UE information, the Prose UE information includes UE-to-Network Relay interest (willingness) indication, to the BS 110. The BS 110, thereon, configures measurement (404) to the UE 120 by sending RRC connection Reconfiguration message. The measurement configuration may include frequency to measure, measurement parameters, trigger to send measurement report, etc.

UE 120 performs Uu link quality measurement according to measurement configuration. The UE 120 generates a measurement report. The measurement report includes, for example, the link quality parameters, between the UE 120 and the BS 110, measured by the UE 120, and the like.

The UE 120 sends (406) the measurement report to the BS 110 thereon the BS 110 determines (408) if the reported RSRP/RSRQ (the link quality parameters) in the measurement report meets the UE-to-Network relay criteria (as detailed above) then the BS 110 commands (410) the UE 120 supporting the UE-to-Network Relay functionality to start transmitting the UE-to-Network relay indication (i.e. discovery message indicating itself as the UE-to-Network relay) on the D2D discovery channel (412).

The UE 120 is transmitting the UE-to-Network relay indication (i.e. discovery message indicating itself as the UE-to-Network relay) and continues Uu link quality measurement and measurement reporting (414) according to measurement configuration.

The UE 120 sends (414) the measurement report to the BS 110. The measurement report includes, for example, the link quality parameters, between the UE 120 and the BS 110, measured by the UE 120, and the like.

The BS 110, therefore, determines (416) whether to stop the UE 120 from transmitting information indicating itself as the UE-to-Network relay based on the measurement report from the UE 120 (i.e., If the reported RSRP/RSRQ in the measurement report does not meet the UE-to-Network relay criteria (as detailed above) then the BS 110 commands (418) the UE 120, supporting the UE-to-Network Relay functionality, to stop transmitting the UE-to-Network relay indication (i.e. discovery message indicating itself as the UE-to-Network relay) on the D2D discovery channel.

Figure 5:
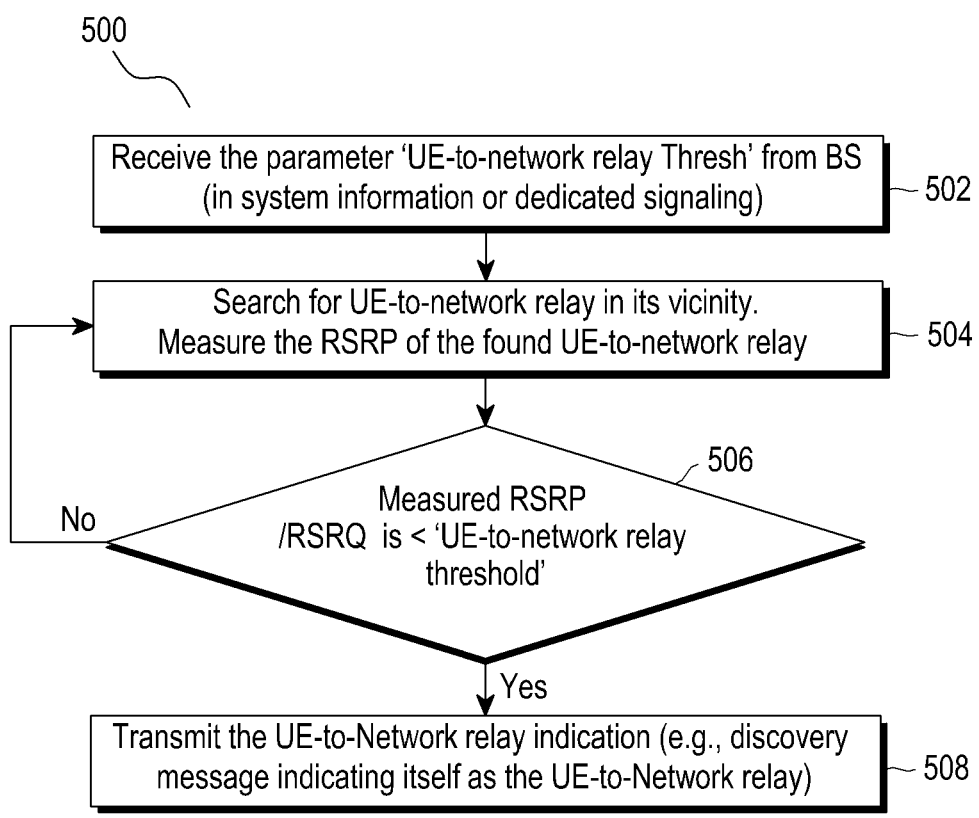
FIG. 5 is an exemplary flow diagram illustrating a method for triggering a transmission of a UE-to-Network relay indication, according to an embodiment as disclosed herein.

FIG. 5 is an exemplary flow diagram illustrating a method for triggering the transmission of the UE-to-Network relay indication, according to an embodiment as disclosed herein. At step 502, the method 500 includes receiving, at the UE 120, the parameter 'UE-to-network relay Thresh' (i.e., the UE-to Network criteria) from the BS 110 (in system information or dedicated signaling).

The BS 110 broadcasts the parameter 'UE-to-NW Relay Thresh' in system information (example in system information block X). Alternately, the BS 110 (i.e., EUTRAN (ENB)) dedicatedly assigns a parameter 'UE-to-NW Relay Thresh' to the UE 120. The UE 120, capable of supporting UE-to-Network relay functionality and interested to perform UE-to-Network Relay functionality and in network coverage reads the system information broadcasted by the cell to which the UE 120 is camped and obtains the parameter 'UE-to-NW Relay Thresh'. Alternately, the UE 120 obtains this from the BS 110 in dedicated signaling.

At step 504, the method 500 includes searching for, the other UE(s) capable of performing, the UE-to-network relay in its vicinity (UE 120 vicinity) and measures the RSRP/RSRQ of the wireless link with the found UE-to-network relay.

At step 506, the method 500 includes measuring the RSRP/RSRQ is less than UE-to-network relay threshold.

If the RSRP/RSRQ is less than UE-to-network relay threshold then at step 508, the method 500 includes transmitting the UE-to-Network relay indication (i.e. discovery message indicating itself as the UE-to-Network relay).

The UE 120 monitors and searches of other UE-to-Network relay in its vicinity and measures the (RSRP/RSRQ) of found UE-to-Network relays. The RSRP/RSRQ can be measured for synchronization signal or Demodulation reference signal (DMRS) or other signal transmitted by the UE-to-Network relay. If the measured RSRP/RSRQ of found UE-to-Network relays are less than the 'UE-to-NW Relay Thresh' then UE 120 starts to transmit the UE-to-Network relay indication (i.e. discovery message indicating itself as the UE-to-Network relay) on the D2D discovery channel.

In an embodiment, the UE 120 executes the aforementioned method 500 in both the RRC idle as well as in the RRC connected state.

In an embodiment, for example, the UE 120, capable of supporting UE-to-Network relay functionality and interested to perform UE-to-Network Relay functionality and in network coverage monitors the synchronization signal transmitted by the remote UE 130. If the UE 120 detects synchronization signal transmitted by the remote UE 130 or if RSRP/RSRQ of detected synchronization signal transmitted by the remote UE 130 is greater than the UE-to-Network criteria then the UE 120 starts to transmit information (e.g. discovery information) indicating itself as the UE-to-Network relay on the D2D discovery channel. Alternately if the UE 120 detects discovery message from the remote UE 130 wherein one bit in discovery message indicates whether discovery message is transmitted by the remote UE 130 or in coverage UE, then UE 120 starts to transmit the UE-to-Network relay indication (i.e. discovery message indicating itself as the UE-to-Network relay) on the D2D discovery channel.

Figure 6:
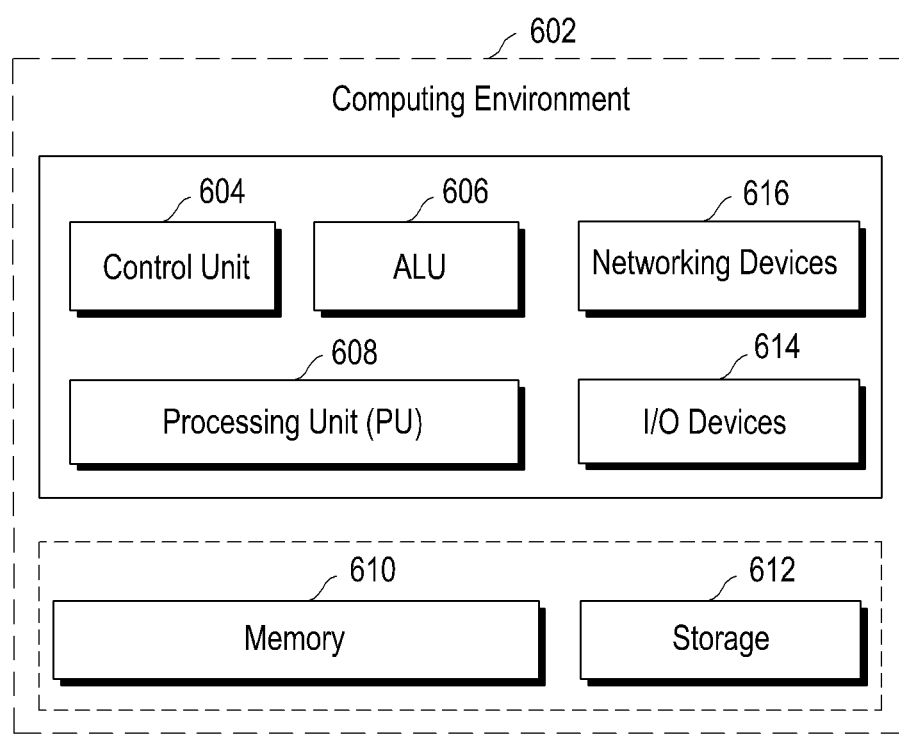
FIG. 6 illustrates a computing environment implementing the method for triggering a transmission of a UE-to-Network relay indication, according to embodiments as disclosed herein.

FIG. 6 illustrates a computing environment implementing the method for triggering a transmission of a UE-to-Network relay indication, according to embodiments as disclosed herein. As depicted in the figure, the computing environment 602 comprises at least one processing unit 608 that is equipped with a control unit 604 and an Arithmetic Logic Unit (ALU) 606, a memory 610, a storage unit 612, plurality of networking devices 616 and a plurality Input output (I/O) devices 614. The processing unit 608 is responsible for processing the instructions of the schemes. The processing unit 608 receives commands from the control unit in order to perform its processing. Further, any logical and arithmetic operations involved in the execution of the instructions are computed with the help of the ALU 606.

The overall computing environment 602 can be composed of multiple homogeneous or heterogeneous cores, multiple CPUs of different kinds, special media and other accelerators. The processing unit 608 is responsible for processing the instructions of the schemes. Further, the plurality of processing units 608 may be located on a single chip or over multiple chips.

The scheme comprising of instructions and codes required for the implementation are stored in either the memory unit 610 or the storage 612 or both. At the time of execution, the instructions may be fetched from the corresponding memory 610 or storage 612, and executed by the processing unit 608.

In case of any hardware implementations various networking devices 616 or external I/O devices 614 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 6 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for controlling a user equipment (UE)-to-network relay, by a UE, the method comprising:
   receiving system information;
   identifying information on a relay discovery configuration based on the received system information;
   identifying information on resource pools used for transmitting a discovery message based on the received system information;
   measuring a link quality based on a reference signal received power (RSRP) measurement of a primary cell (PCell) or a cell on which the UE camps; and
   transmitting the discovery message based on the information on the relay discovery configuration and the information on the resource pools used for transmitting the discovery message, if the measured link quality between the UE and a base station is lower than a first threshold and higher than a second threshold,
   wherein the UE is in a radio resource control (RRC) idle state.

2. The method of claim 1, wherein:
   the first threshold is determined based on a maximum link quality threshold and a maximum hysteresis value, and
   the second threshold is determined based on a minimum link quality threshold and a minimum hysteresis value.

3. The method of claim 2, transmitting the discovery message comprising transmitting the discovery message based on the information on the relay discovery configuration and the information on the resource pools used for transmitting the discovery message, if the measured link quality is lower than the maximum link quality threshold based on the maximum hysteresis value and higher than the minimum link quality threshold based on the minimum hysteresis value.

4. The method of claim 1, further comprising informing upper layers that the UE is configured with radio resources being used for a relay related discovery transmission.

5. A user equipment (UE) for controlling a user equipment (UE)-to-network relay, the UE comprising:
   a transceiver configured to receive system information; and
   a processor coupled with the transceiver, wherein the processor is configured to:
   identify information on a relay discovery configuration based on the received system information,
   identify information on resource pools used for transmitting a discovery message based on the received system information,
   measure a link quality based on a reference signal received power (RSRP) measurement of a primary cell (PCell) or a cell on which the UE camps, and
   transmit the discovery message based on the information on the relay discovery configuration and the information on the resource pools used for transmitting the discovery message, if the measured link quality between the UE and a base station is lower than a first threshold and higher than a second threshold, wherein the UE is in a radio resource control (RRC) idle state.

6. The UE of claim 5, wherein:
the first threshold is determined based on a maximum link quality threshold and a maximum hysteresis value, and
the second threshold is determined based on a minimum link quality threshold and a minimum hysteresis value.

7. The UE of claim 6, wherein the processor is further configured to transmit the discovery message based on the information on the relay discovery configuration and the information on the resource pools used for transmitting the discovery message, if the measured link quality is lower than the maximum link quality threshold based on the maximum hysteresis value and higher than the minimum link quality threshold based on the minimum hysteresis value.

8. The UE of claim 5, wherein the processor is further configured to inform upper layers that the UE is configured with radio resources being used for a relay related discovery transmission.

* * * * *